(12) United States Patent
Zimmer et al.

(10) Patent No.: US 6,681,440 B2
(45) Date of Patent: Jan. 27, 2004

(54) WINDSHIELD WIPER

(75) Inventors: Joachim Zimmer, Sasbach (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/130,654

(22) PCT Filed: Sep. 15, 2001

(86) PCT No.: PCT/DE01/03554

§ 371 (c)(1), (2), (4) Date: Aug. 7, 2002

(87) PCT Pub. No.: WO02/24498

PCT Pub. Date: Mar. 28, 2002

(65) Prior Publication Data

US 2003/0131437 A1 Jul. 17, 2003

(30) Foreign Application Priority Data

Sep. 20, 2000 (DE) .......................... 100 46 439

(51) Int. Cl.⁷ ............................... B60S 1/40; B60S 1/32
(52) U.S. Cl. ............................. 15/250.32; 15/250.351
(58) Field of Search ...................... 15/250.32, 250.44, 15/250.43, 250.31, 250.351, 250.33, 250.48, 250.46, 250.361

(56) References Cited

U.S. PATENT DOCUMENTS 2,046,495 A * 7/1936 Whitted ................... 15/250.32

FOREIGN PATENT DOCUMENTS

| DE | 87 10 593 | 12/1988 | | |
| DE | 42 24 866 | 2/1994 | | |
| DE | 195 37 854 | 4/1997 | | |
| DE | 198 15 171 | 6/1999 | | |
| EP | 0354279 | * 2/1990 | .............. | 15/250.46 |
| FR | 2499921 | * 8/1982 | .............. | 15/250.32 |
| FR | 2630070 | * 10/1989 | .............. | 15/250.46 |
| FR | 2 788 027 | 7/2000 | | |

* cited by examiner

*Primary Examiner*—Gary K. Graham
(74) *Attorney, Agent, or Firm*—Kenyon & Kenyon (57) ABSTRACT

A windshield wiper having a wiper arm, which is made up of a mounting part and a hinge member including an integrated wiper rod having a u-shaped cross-section profile, and on which a wiper blade pivots via a retaining spring; the side walls of retaining spring being connected by an open hub for a hinge pin and which guide the wiper rod on the outside by their projecting inner walls. The u-shaped cross-section profile extends to the free end of the wiper rod, and, in the end region, in side flanges of the cross-section profile located across from one another, at least one crosspiece-pair is preformed, at least one of which being provided with a flap bent toward the inside, the retaining spring engaging by at least one longitudinally positioned plug between the strips of a crosspiece-pair and locking into place on the wiper rod.

13 Claims, 8 Drawing Sheets

WINDSHIELD WIPER

FIELD OF THE INVENTION

The present invention relates to a windshield wiper.

BACKGROUND INFORMATION

Windshield wipers may have a wiper arm, which may be made up of a driven mounting part and a hinge member, which may be connected to it via a hinged joint. The mounting part and the hinged part may have a u-shaped cross-section profile that is open toward the vehicle windshield. Additional components may be located in the interior space of the profile. Located in the interior space of the cross-section profile of the hinge member, for instance, may be an extention spring, which may prestress the hinge member with the mounting part. In some exemplary embodiments, water lines and/or spray nozzles of a windshield-washer system may also be accommodated in the u-shaped cross-section profile of the hinge member.

A hinge member is discussed in German Published Patent Application No. 198 15 171 in which the front area of the integrated wiper rod is folded over several times and bent in the shape of a hook. This may require several method steps in the manufacture. Furthermore, exposing galvanized sheet material to heavy 180° bending may carry a risk that the tin coating will tear and/or detach in the heavily deformed areas. Furthermore, due to the low height of the material accumulation in the area of the hook, the moment of resistance against bending and torsion may be relatively low, so that the wiper rod may elastically deform in response to pressure, and may tend to rattle.

The wiper blade may be equipped with a bracket assembly and a wiper strip retaining it. The hook of the wiper rod may engage with a retaining spring, which may be mounted by an open hub on a hinge pin of a center clip of the bracket assembly and may be used as an adapter and bearing part between the wiper strip and the wiper blade. The hinge formed in this manner and the bracket assembly may allow the wiper strip to adapt to a curvature of the vehicle windshield. In order to laterally guide the wiper blade, the retaining spring, on the one side, may be guided along its lateral walls between two side flanges of the center clip and, on the other side, along the lateral surfaces of the engaged wiper rod. However, the lateral surfaces may be relatively small. Therefore, they may be subjected to high loads and may wear out quickly, so that the wiping quality may rapidly decrease due to poor guidance of the wiper blade.

In order to exchange a worn wiper blade, the wiper blade may be rotated at an approximately 90° angle, and the retaining spring may be pulled out of the hook in a longitudinal direction. This may be awkward, such as, for example, with relatively long hooks, since the installation space for sliding the rotated wiper blade in the longitudinal direction toward the vehicle windshield may be limited.

The German Published Patent Application No. 195 37 854, discusses joining a wiper arm and a wiper blade using a retaining spring. At least one finger, angled in the direction of the vehicle windshield at the free end of the wiper rod, may engage in a positive locking manner with a corresponding guide shaft of the retaining spring. In the guide shaft, the bent finger may be retained by an automatic detent device, which may be preformed on the retaining spring. A slight rotation may be sufficient to exchange the wiper blade, enabling the detent device to be unlocked and the wiper blade to be easily slid off the wiper-arm end in the direction of the vehicle windshield. However, the wiper rod and the preformed finger may be made of flat coiled stock, the material thickness determining the small size of the lateral guide surfaces, and may have a low moment of resistance in response to bending and torsion.

SUMMARY OF THE INVENTION

According to an exemplary embodiment; of the present invention, a u-shaped cross-section profile of the hinge member may extend to the free end of the wiper rod, and individual crosspieces may be formed in the end region. In side flanges of the cross-section profile lying across from one another, at least one of these crosspieces of at least one crosspiece pair may have a flap angled toward the inside, a retaining spring engaging between the crosspieces of a pair of crosspieces with a plug pointing in the longitudinal direction, and locking into place on the wiper rod. Due to the continuous u-profile, the hinge member configured in one piece with the wiper rod, may have a high bending and torsion rigidity, as a result of which the wiper blade may be guided across the vehicle windshield at a relatively constant setting angle, regardless of the operating conditions. This may result in good wiping outcomes. Because of the increased bending and torsion rigidity of the u-profile, the sheet metal thickness may be reduced if desired, so that the weight and the material cost of the wiper arm may also be reduced.

Furthermore, the production may be simplified and costs may be saved, since the hinge member may be produced from one sheet metal cut in two bending steps and, in some instances, one calibration step. At the same time, other regions of the wiper arm may be produced during the bending of the edges of the metal sheets, such as the areas that may be later required for attaching the extension spring. The bending angle may be limited to no larger than 90° in any region, so that no extreme deformations may occur and no danger may arise that the protective layer of the coated materials detaches or tears at the bending points. Therefore, galvanized sheet metal panels or also other materials, such as aluminum, may be used without problems.

On the hinge member, the lateral outer surfaces of the crosspieces and the adjoining u-shaped wiper rod may form larger guide surfaces with respect to the retaining spring than other wiper rods having a hook-shaped end. Furthermore, the guidance may be improved by the plug, which may engage with the cavity between the crosspieces of a crosspiece pair by a slight slide fit or press fit. As a result, a sturdy connection may be simultaneously created between the retaining spring and the wiper rod. The improved guidance of the wiper blade may have a positive effect on the wiping quality, the rattling tendency of the wiper blade may be reduced when little moisture is present on the vehicle windshield.

In order to secure the retaining spring between the crosspieces in the axial direction, it may be provided with a stop spring, which, in the mounted state, may lock into the front side of a crosspiece or a flap. To disassemble the wiper blade, the riveting pin of the wiper blade may be pulled out of the open hub of the retaining spring, or the wiper blade may be disassembled from the wiper rod together with the retaining spring. For this purpose, the wiper blade may be slightly rotated with respect to the wiper arm, which may suffice to reach and disengage the stop spring. The wiper blade may then be slid in the longitudinal direction until the crosspiece pairs on the wiper rod slide off the plugs. In a last disassembly step, the retaining spring may be pulled vertically out from the wiper arm.

The assembly may be done in the reverse order and may also be accomplished in only two directions by an automatic detent device; no additional tools may be required. In this manner, an incorrect assembly of components or scratching by the use of unsuitable tools may be avoided. In the described assembly or disassembly, the retaining spring may be preinstalled on the wiper blade and exchanged together with the wiper blade, so that a material may be used that is less prone to wear and may approximately ensure the service life of the wiper blade.

It may also be premounted on the wiper rod and may be required to have a correspondingly longer service life, which may be assured by a longer-wearing material.

This approach may be used in windshield wipers having a continuous configuration, since no openings may be required as mounting aids, and the wiper arm may cover most of the retaining spring and the opening in the center clip toward the exterior.

DETAILED DESCRIPTION

Figure 1:
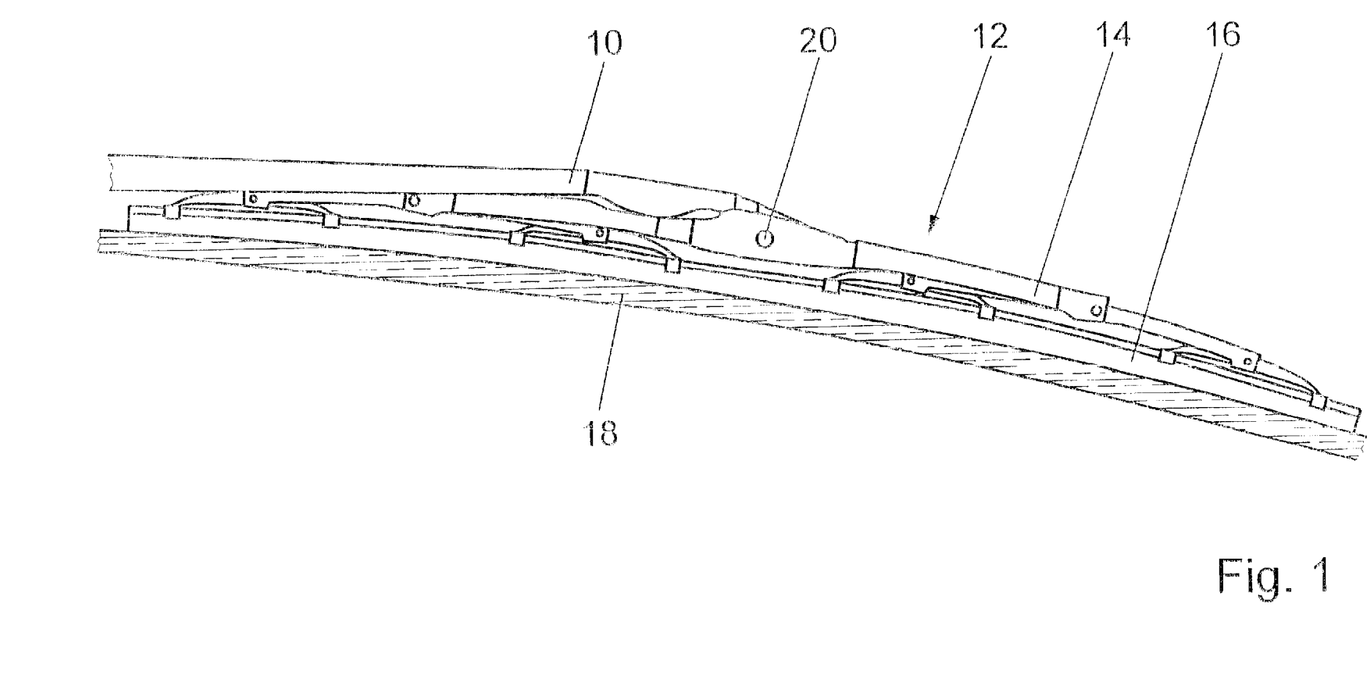
FIG. 1 shows a wiper rod having a hinged wiper blade.

A wiper blade 12, made up of a bracket assembly 14 and a wiper strip 16, is rotatably connected to a wiper rod 10 via a hinge, so that wiper strip 16 may adapt to the differently curved contour of a vehicle windshield 18 during the wiping movement (FIG. 1). The hinge is provided with a hinge pin 20, which is located on bracket assembly 14 and locks into place in an open hub 66 of a retaining spring 22 formed by feather tongues 80.

Figure 2:
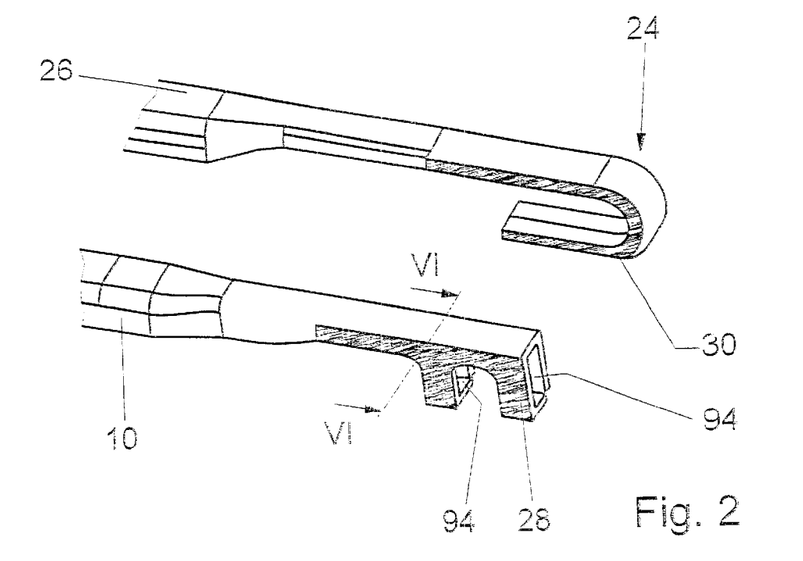
FIG. 2 shows an end region of a wiper rod according to an exemplary embodiment of the present invention, viewed from above, in comparison to another wiper rod.

Wiper rod 10 has a u-shaped cross-section profile, which, according to an exemplary embodiment of the present invention, extends to the free end. At this free end, crosspiece pairs 38 and 40, which have a clearance 58 with respect to one another, are punched from side flanges 32 and 34 of the u-shaped cross-section profile. At each free end of a crosspiece of a crosspiece pair 38, 40, flaps 44, 46 are premolded, which are bent toward the inside at an approximately 900 angle and thus extend approximately parallel to top wall 42 of the u-shaped cross-section profile. Crosspiece pair 38 and 40, respectively, top wall 42 and flaps 44, 46 surround a cavity 94 that is open in the longitudinal direction (FIG. 2).

Figure 3:
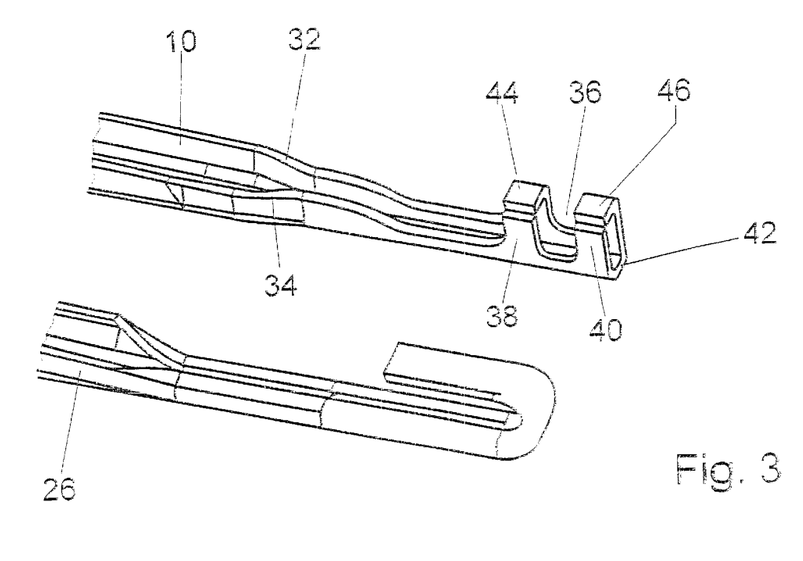
FIGS. 3–5 show an end region of a wiper rod according to an exemplary embodiment of the present invention, viewed from below, in comparison to another wiper rod, along a line VI—VI in FIG. 2.
Figure 4:
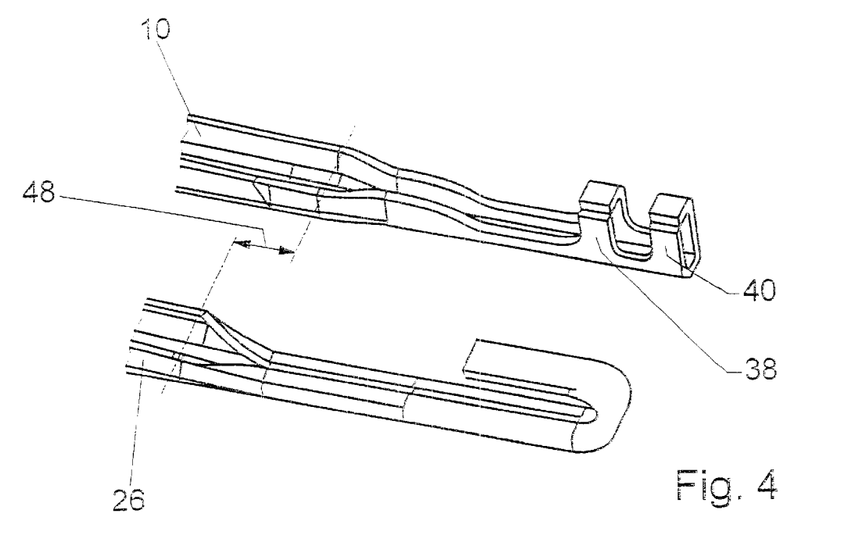
Figure 5:
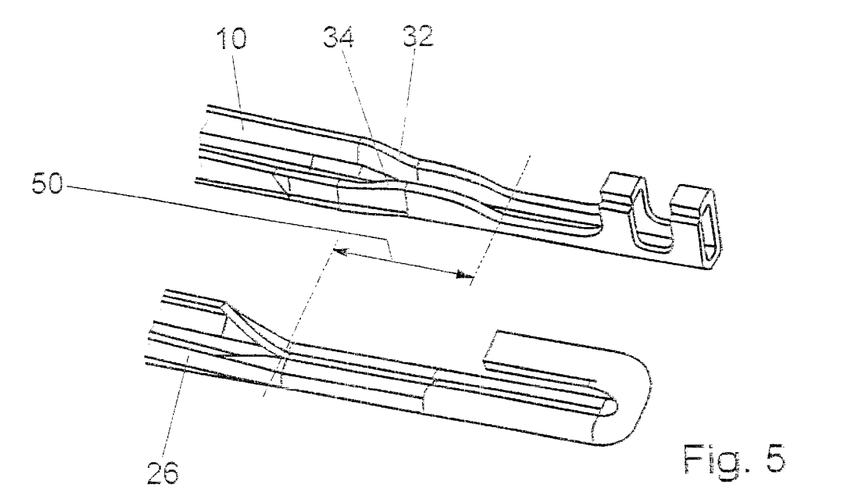
Figure 6:
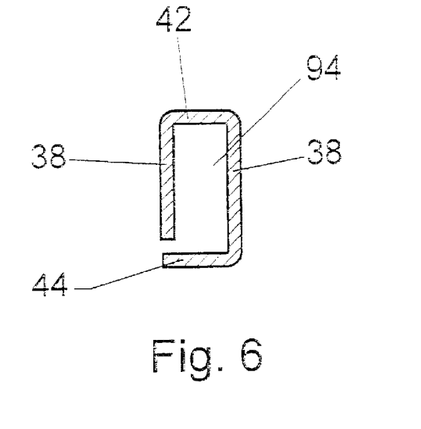
Figure 7:
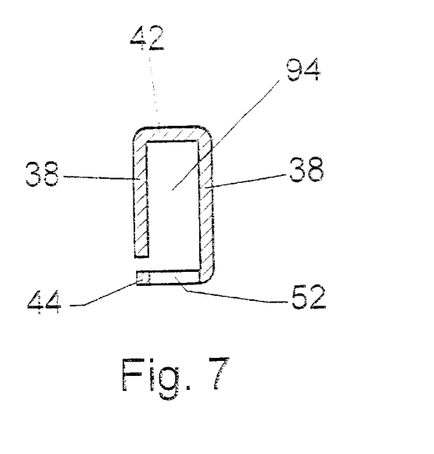
FIGS. 7–9 show exemplary variants of the wiper rod shown in FIG. 6.
Figure 8:
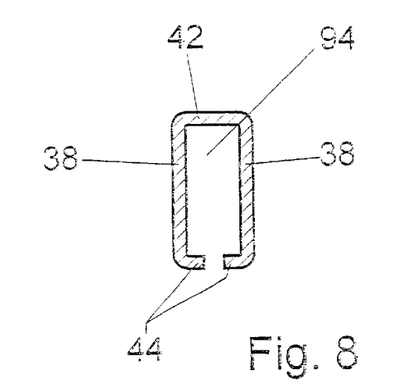
Figure 9:
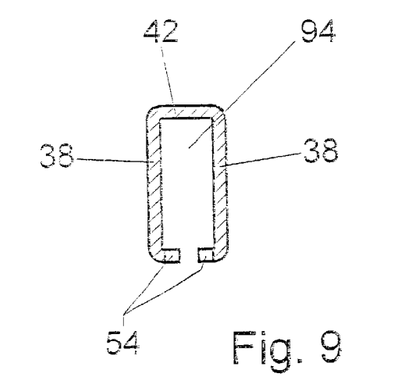
Figure 17:
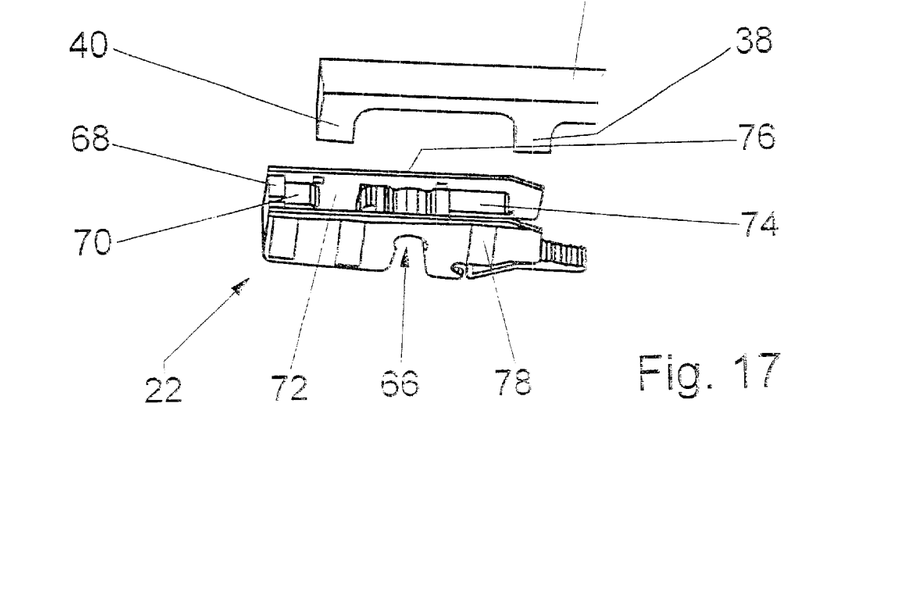
FIG. 17 shows a perspective representation of a retaining spring, viewed from above.
Figure 18:
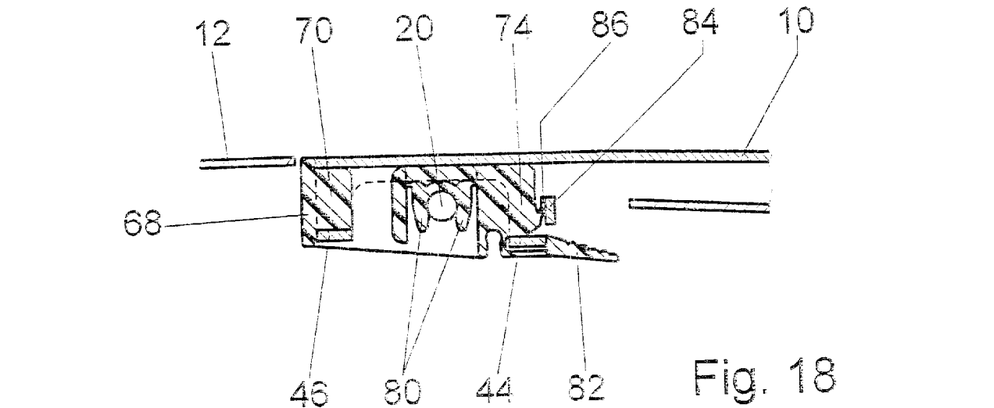
FIG. 18 shows a longitudinal section through a retaining spring.

The u-shaped cross-section profile of wiper rod 10 is produced from a flat sheet metal piece, which may be punched from a galvanized sheet metal panel. Side flanges 32, 34 having crosspieces 38, 40 and flaps 44, 46 are bent at a right angle to top wall 42 (FIG. 3). In a further bending step, flaps 44, 46 are bent an additional 90° with respect to the crosspieces. According to FIGS. 2 through 5 and FIGS. 11, 12, 15, the crosspieces of crosspiece pairs 38 and 40 each have a flap 44 and 46 on the same side flange 32 in each case, which extends parallel to top wall 42 and reaches up to the respective crosspiece of the other side flange 34 located across from it, while flaps 44 and 46 of crosspiece pairs 38, 40, in the exemplary embodiment according to FIG. 13, are assigned different side flanges 32, 34. FIG. 8 and FIG. 9 show short flaps 44 starting from crosspiece pairs 38 lying opposite one another and forming a small gap in the center between the crosspieces. Clearance 58 between crosspieces 38 and 40 is formed by a cut-out 36 in the sheet metal part (FIG. 3). It may be dimensioned in accordance with the requirements of the particular application case. Furthermore, height 88 of side flanges 32, 34 is reduced in front of retaining spring 22, facilitating the assembly of retaining spring 22. Crosspiece pairs 38, 40 and flaps 44, 46 are used to attach retaining spring 22 on wiper rod 10 (FIG. 17). Retaining spring 22 has two side walls 76 and 78, which are connected by an open hub 66, and a front wall 68 at the end of retaining spring 22. Between side walls 76 and 78, two plugs 70 and 74 extend in the longitudinal direction of retaining spring 22, one plug 70 being connected at one end to front wall 68, and the other plug 74 being connected at one end to hub 66. Between the free end of first plug 70 and hub 66 is an assembly shaft 72. For assembly purposes, crosspiece pair 40 is introduced into assembly shaft 72 and then slid axially onto plug 70 together with flap 46, while crosspiece pair 38 with flap 44 glides over plug 74. In the assembled state, plug 70 will then engage with a slight pressure fit or sliding fit in cavity 94 of crosspiece pair 40, front wall 68 being used as stop (FIG. 18).

Figure 14:
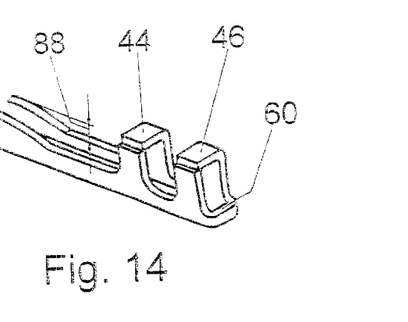
Figure 15:
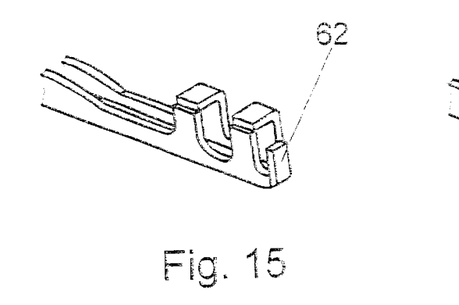
Figure 16:
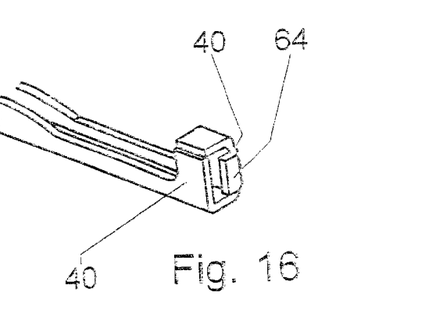

Retaining spring 22 has a stop spring 82 at plug 74, which automatically locks into place at flap 44 of crosspiece pair 38, so that retaining spring 22 is connected to wiper rod 10 in a self-locking manner. Stop spring 82 may also be located at some other area of retaining spring 22, so that it locks into place, for example, at the edges or the front sides of crosspiece pairs 38, 40, or in stop holes 52 (FIG. 10) and stop notches, respectively. In order to ensure that there is no play in the mounting in the lateral direction, a tensioning element 86 is provided, which is formed on plug 74 and is supported at an axial stop 84 of wiper rod 10, so that retaining spring 22 is prestressed between stop spring 82 and tensioning element 86. Tensioning element 86 may also be arranged in such a manner that it is supported on stop 62, 64 (FIG. 15, FIG. 16). Stop 62 is located on top wall 42, stop 64 at a crosspiece pair 40. Furthermore, a stop may also be formed by a collar 60, which is preformed on top wall 42 (FIG. 14). Additionally, a stop may also be preformed on the flap.

The wiper according to an exemplary embodiment of the present invention may provide good guidance of wiper blade 12. On the one hand, this may be the result of the rigid and torsionally stiff u-shaped cross-profile being configured in one piece up to the area of the retaining spring, so that wiper rod (10) has a greater bending and torsion stiffness in an area 50 (FIG. 5) than the usual hook-shaped end 24 of a wiper rod 26. Furthermore, additional component parts may be accommodated in the elongated building space, in particular in an area 48 of the open cross-section profile (FIG. 4) between side flanges 32, 34, such as water lines or spray nozzles of a windshield-washer system. On the other hand, compared to lateral guidance surfaces 30 of wiper rod 26, large lateral guidance areas 28 (FIG. 2) result from crosspiece pairs 38, 40 and the adjoining parts of side flanges 32, 34, which may be adapted to the given operating conditions. Large guidance areas 28 may lower the specific load of the contact surfaces between wiper rod 10 and retaining spring 22, so that the wear may be low and the guidance quality during the service life of the windshield wiper may be maintained.

Figure 10:
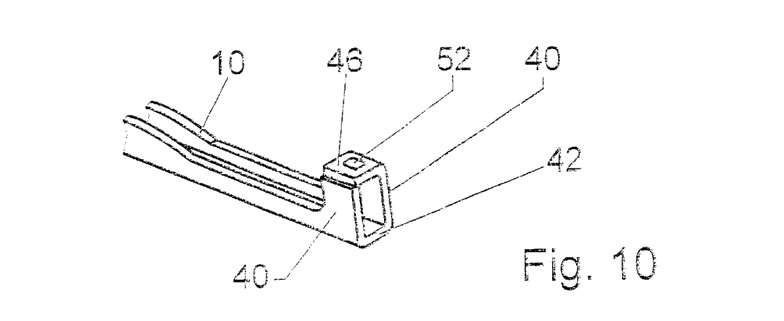
FIG. 10 shows a perspective representation of an end region and a crosspiece pair.
Figure 11:
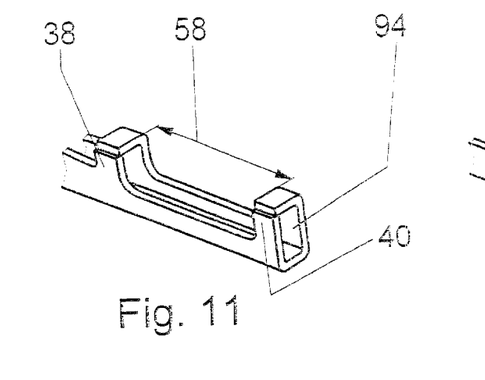
FIGS. 11–16 show exemplary variants of the wiper rod shown in FIG. 10.

The guidance and joining of retaining spring 22 are also supported by plugs 70, 74, which engage with the cavities 94 between the crosspiece pairs 38, 40. In this manner, one crosspiece pair 40 may be sufficient for applications with a low load (FIG. 10). A stop hole 52 or a release 54 (FIG. 9) may be used to lock retaining spring 22.

Figure 12:
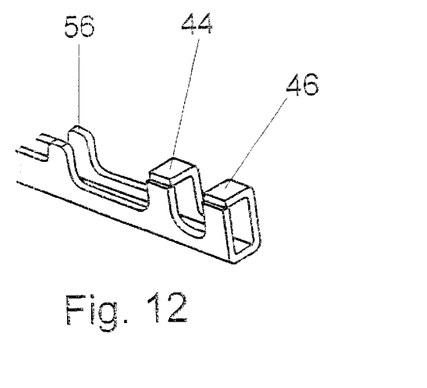
Figure 13:
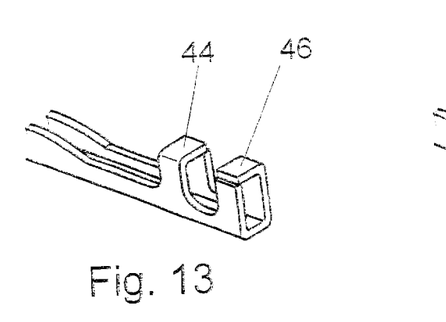

FIG. 12 shows a variant in which an additional crosspiece pair 56 is provided, which is located in front of first crosspiece pair 38 and additionally guides wiper blade 12 (FIG. 12). This may result in a particularly long guidance of wiper blade 12 in the longitudinal direction.

Compared to wiper rod 26 (FIG. 3), wiper rod 10 does not have any angled regions with bending angles of 180°, but only of maximally 90°, thereby substantial material deformations and damage of protective layers resulting from these may be avoided.

Due to the numerous variants for arranging the cross-section of crosspieces 38, 40 and flaps 44, 46, which may also be combined with one another, many already existing retaining springs 22 may be accommodated and a large number of application cases may be covered.

Figure 19:
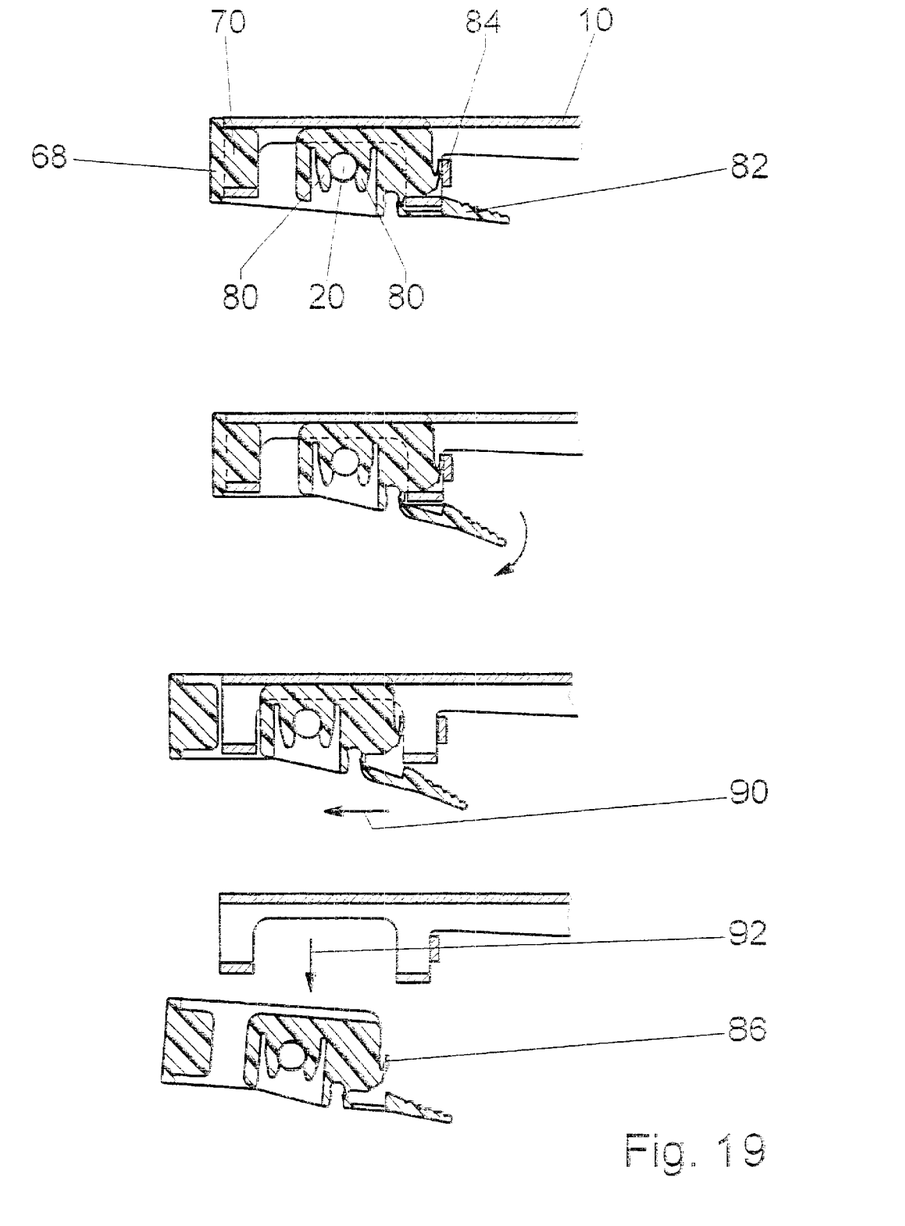
FIG. 19 shows a step-by-step disassembly of a retaining spring.
Figure 20:
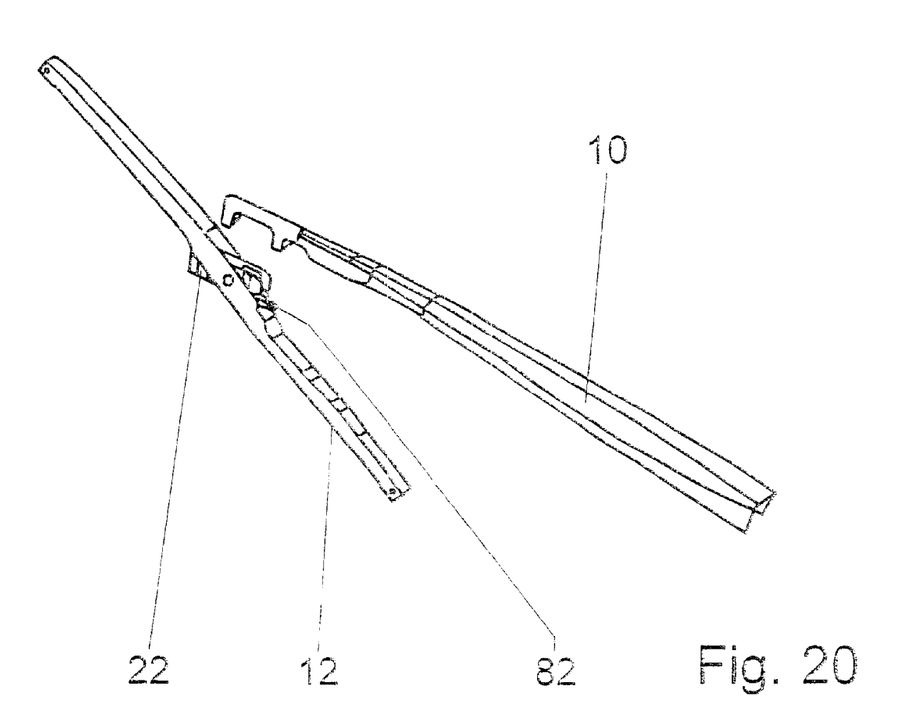
FIG. 20 shows a perspective representation of a wiper blade and a wiper arm during assembly and disassembly, respectively.

Wiper rod 10 covers retaining spring 22 nearly completely towards the outside and is arranged with its free end and retaining spring 22 between the lateral walls of a center clip of bracket assembly 14, resulting in a continuous configuration with wiper blade 12. In order to change wiper blade 12, hinge pin 20 is pulled out from open hub 66, or wiper rod 10 is slightly rotated with respect to wiper blade 12, stop spring 82 also projecting beyond wiper 12 and being able to be unlocked (FIG. 19 and FIG. 20). Wiper rod 10 is then shifted in direction 90. In doing so, crosspiece pair 40 reaches into assembly shaft 72, while crosspiece pair 38 slides off plug 74. Wiper rod 10 is then removed from retaining spring 22 by a vertical movement in direction 92. Therefore, retaining spring 22 may be premounted on hinge pin 20 of wiper blade 12 or on wiper rod 10.

What is claimed is:

1. A windshield wiper, comprising:
    a wiper arm having a mounting part and a hinge member, the hinge member including an integrated wiper rod having a u-shaped cross-section profile extending to a free end of the wiper rod, the u-shaped cross-section profile having opposite side flanges and at least one crosspiece pair formed in the opposite side flanges at the free end, the at least one crosspiece pair including at least one crosspiece having a flap that is bent toward an inside;
    a wiper blade;
    a hinge pin; and
    a retaining spring to couple the wiper blade to the wiper rod, the retaining spring including side walls having projecting inner sides to guide the wiper rod on an outside, an open hub to connect the side walls and to engage the hinge pin, and at least one longitudinally oriented plug to engage and lock the wiper rod in a place between crosspieces of the at least one crosspiece pair.

2. The windshield wiper according to claim 1, wherein the flap includes a stop hole.

3. The windshield wiper according to claim 1, further comprising:
    an angled stop preformed on one of a top wall of the u-shaped cross-section profile, a crosspiece of the at least one crosspiece pair, and the flap, the angled stop beginning at a front side at the free end of the wiper rod.

4. The windshield wiper according to claim 1, wherein the at least one crosspiece pair includes two crosspiece pairs having a clearance with respect to one another.

5. The windshield wiper according to claim 1, wherein the opposite side flanges of the u-shaped cross-section profile have a reduced height in front of a first crosspiece pair.

6. The windshield wiper according to claim 1, wherein flaps on different crosspiece-pairs are preformed on crosspieces located on a same side flange of the opposite side flanges.

7. The windshield wiper according to claim 1, wherein flaps on different crosspiece-pairs are preformed alternately on one of a crosspiece located on a first side flange of the opposite side flanges and a crosspiece located oh a second side flange of the opposite side flanges, the first side flange being arranged opposite the second side flange.

8. The windshield wiper according to claim 1, wherein the retaining spring includes:
    a front wall at the free end having an end face, and
    at least one plug connected to one of the end face and the hub.

9. The windshield wiper according to claim 8, wherein the retaining spring includes at least one transversely running assembly shaft arranged between the front wall and the hub through which a crosspiece pair of the wiper rod is guided during assembly.

10. The windshield wiper according to claim 1, wherein:
    the at least one crosspiece pair includes a crosspiece having an end face, and
    the retaining spring includes a stop spring arranged to lock into a place at the flap.

11. The windshield wiper according to claim 1, wherein the wiper rod includes an axial stop and the retaining spring includes a tensioning element to support the retaining spring on the axial stop.

12. The windshield wiper according to claim 1, wherein the retaining spring is premounted on the wiper rod.

13. The windshield wiper according to claim 1, wherein the retaining spring is premounted on the wiper blade.

* * * * *